US009228567B2

United States Patent
Bitsch et al.

(10) Patent No.: US 9,228,567 B2
(45) Date of Patent: Jan. 5, 2016

(54) TRANSPORTATION OF DRIVE TRAIN COMPONENTS IN A WIND TURBINE NACELLE

(75) Inventors: Michael Lundgaard Bitsch, Langa (DK); Abolfazlian Mazyar, Brabrand (DK); Morten Mogensen, Hvidovre (DK)

(73) Assignee: Vestas Wind Systems A/S, Aarhus N. (DK)

(*) Notice: Subject to any disclaimer, the term of this patent is extended or adjusted under 35 U.S.C. 154(b) by 241 days.

(21) Appl. No.: 13/994,646

(22) PCT Filed: Dec. 8, 2011

(86) PCT No.: PCT/DK2011/050469
§ 371 (c)(1),
(2), (4) Date: Oct. 2, 2013

(87) PCT Pub. No.: WO2012/079579
PCT Pub. Date: Jun. 21, 2012

(65) Prior Publication Data
US 2014/0017047 A1    Jan. 16, 2014

Related U.S. Application Data

(60) Provisional application No. 61/423,287, filed on Dec. 15, 2010.

(30) Foreign Application Priority Data

Dec. 15, 2010  (DK) ................................ 2010 01126

(51) Int. Cl.
*F03D 11/00*     (2006.01)
*F03D 1/00*      (2006.01)
(Continued)

(52) U.S. Cl.
CPC ............... *F03D 11/00* (2013.01); *B65G 37/00* (2013.01); *F03D 1/001* (2013.01); *F03D 1/003* (2013.01);
(Continued)

(58) Field of Classification Search
CPC .. B66C 23/207; B66C 23/027; B66C 23/185; B66C 23/20; B66C 23/18; F03D 1/003
See application file for complete search history.

(56) References Cited

U.S. PATENT DOCUMENTS 6,796,199 B2 *  9/2004  Kurz ............................. 74/89.32
7,735,808 B2 *  6/2010  Viladomiu i Guarro et al. ............................. 254/278
(Continued)

FOREIGN PATENT DOCUMENTS

EP    1677007 A2 *  7/2006
EP    2147885 A1     1/2010
(Continued)

OTHER PUBLICATIONS

Danish Patent Office, DK Search and Examination Report issued in corresponding DK Application No. PA201001126 dated Jul. 22, 2011, 4 pages.
(Continued)

*Primary Examiner* — Kaitlin Joerger
(74) *Attorney, Agent, or Firm* — Wood, Herron & Evans, LLP

(57) ABSTRACT

The invention relates to a transportation system for transporting at least one drive train component (7a, 7b, 7c) of a wind turbine (1) comprising a tower (2) and a nacelle (3) arranged on the top of said tower, said transportation system comprising a displacement system comprising one or more transportation rails (8, 8a, 8b) being arranged to support said at least one drive train component during displacement thereof, the displacement system facilitating displacement of the drive train component substantially parallel to the rotor axis between an installation location for the drive train component and a second location (10) by means of a first drive arrangement of said displacement system, and a second drive arrangement (11) mounted on said nacelle and comprising at least one winch (12), said second drive arrangement being separate to said displacement system and facilitating transportation of said drive train component between said second location and a lower level when connected to the drive train component independently of the operation of the displacement system. The invention furthermore relates to a wind turbine nacelle with a transportation system and a method of transporting a drive train component of a wind turbine.

14 Claims, 9 Drawing Sheets

Figure 1:
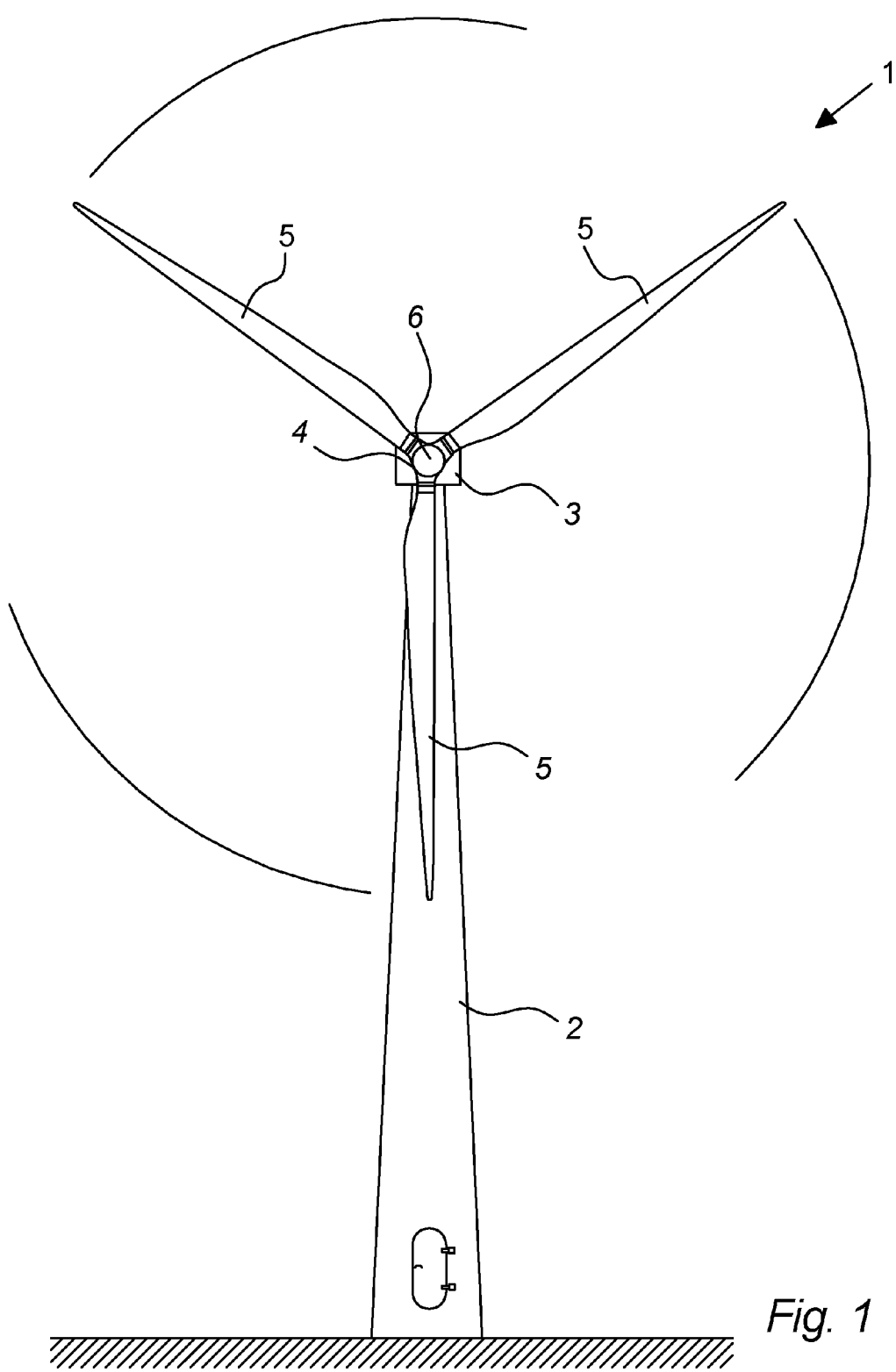

(51) Int. Cl.
*F03D 11/02* (2006.01)
*B65G 37/00* (2006.01)

(52) U.S. Cl.
CPC ............. *F03D 11/02* (2013.01); *F05B 2230/60* (2013.01); *F05B 2230/61* (2013.01); *Y02E 10/722* (2013.01); *Y02E 10/726* (2013.01); *Y02E 10/728* (2013.01)

(56) References Cited

U.S. PATENT DOCUMENTS

| | | | |
|---|---|---|---|
| 8,104,631 B2* | 1/2012 | Stegemann et al. | 212/179 |
| 8,172,100 B2* | 5/2012 | Kappel et al. | 212/323 |
| 8,500,400 B2* | 8/2013 | Signore et al. | 416/1 |
| 8,721,258 B2* | 5/2014 | Eriksen et al. | 415/4.3 |
| 2007/0200103 A1* | 8/2007 | Viladomiu i Guarro et al. | 254/334 |
| 2010/0011575 A1* | 1/2010 | Numajiri | 29/889.1 |
| 2012/0125876 A1* | 5/2012 | Park et al. | 212/312 |
| 2012/0201677 A1* | 8/2012 | Krishnan et al. | 416/9 |
| 2013/0223964 A1* | 8/2013 | Zheng et al. | 414/560 |
| 2013/0234443 A1* | 9/2013 | Casazza | 290/55 |
| 2014/0175038 A1* | 6/2014 | Arlaban Gabeiras et al. | 212/195 |
| 2014/0286788 A1* | 9/2014 | Cho et al. | 416/244 R |
| 2014/0334908 A1* | 11/2014 | Hansen et al. | 414/749.6 |
| 2015/0044011 A1* | 2/2015 | Matulewicz et al. | 414/800 |

FOREIGN PATENT DOCUMENTS

| | | | |
|---|---|---|---|
| EP | 2246561 A2 | 11/2010 | |
| EP | 2505541 A1 * | 10/2012 | |
| WO | 2007/096008 A1 | 8/2007 | |
| WO | 2009/074859 A2 | 6/2009 | |
| WO | 2010/024510 A1 | 3/2010 | |
| WO | 2010/031528 A2 | 3/2010 | |
| WO | WO 2010031528 A2 * | 3/2010 | ............... F03D 1/00 |

OTHER PUBLICATIONS

International Searching Authority, Search Report and Written Opinion issued in corresponding PCT/DK2011/050469 dated Apr. 16, 2012, 13 pages.

International Bureau, International Preliminary Report on Patentability issued in corresponding PCT Application No. PCT/DK2011/050469, dated Jun. 18, 2013, 8 pages.

* cited by examiner

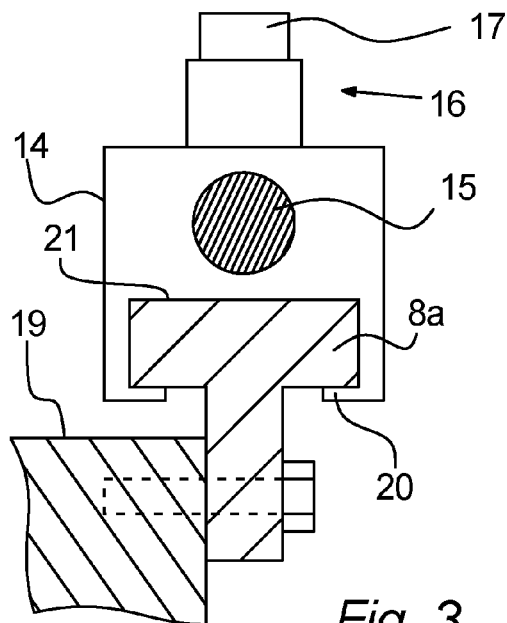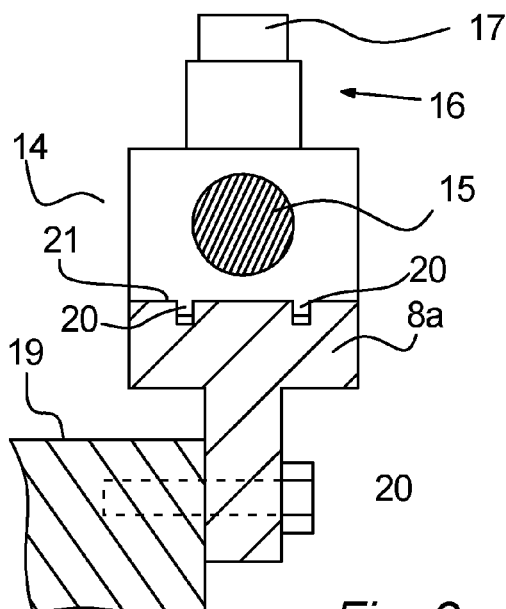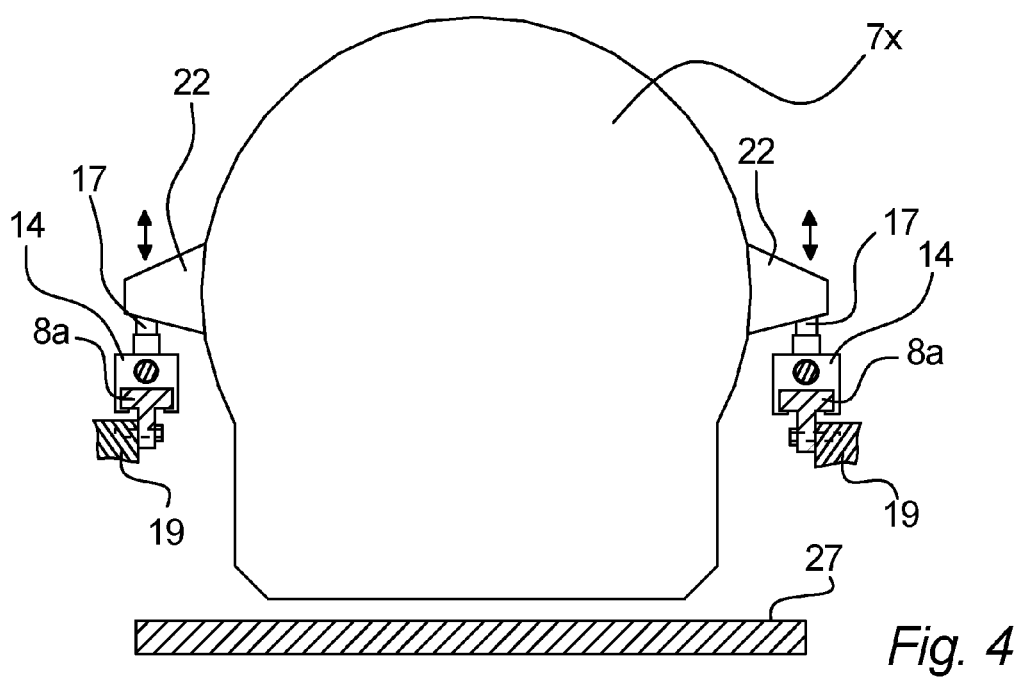

TRANSPORTATION OF DRIVE TRAIN COMPONENTS IN A WIND TURBINE NACELLE

The invention relates to a transportation system for transporting drive train components in a wind turbine, a wind turbine nacelle comprising a transportation system and a method of transporting a drive train component in a wind turbine

BACKGROUND

The size of wind turbines for production of power has increased over the years and has reached a size that result in more difficult and complex transportation of the components of the wind turbines, both during transportation of wind turbine components to an installation location, during install of the components and during service on components of the wind turbines.

Especially installation of and service on drive train components of a wind turbine may be inconvenient in that especially drive train components are very heavy, large and thus hard to handle.

U.S. Pat. No. 6,232,673 discloses a wind turbine comprising a drive train module of a wind turbine that by means of a crane can be removed from the of the wind turbine along mounting rails and can be lowered by the crane for repair and maintenance.

EP1991521 discloses a wind turbine with a nacelle comprising an overhead crane for suspending and horizontally moving a dismantled main component of a wind turbine to a lowering position in the nacelle, before lowering the main component towards the ground via an opening in the nacelle.

Both of the above solutions suffers from several disadvantages e.g. in that they are space consuming solutions that requires much space in the nacelle, and that they are systems that are troublesome and time consuming to operate.

WO2009/074859 discloses a wind turbine with guide rails arranged underneath main components in a nacelle of a wind turbine, allowing the components to slide horizontally during disassembly of the components in the wind turbine nacelle. This solution also suffers from several disadvantages, e.g. in that it is a troublesome and time consuming system to operate.

It is thus an object of the invention to overcome the above mentioned drawbacks.

THE INVENTION

The invention relates to a transportation system for transporting at least one drive train component of a wind turbine comprising a tower and a nacelle arranged on the top of said tower, said transportation system comprising:
  a displacement system comprising one or more transportation rails being arranged to support said at least one drive train component during displacement thereof,
  the displacement system facilitating displacement of the drive train component substantially parallel to the rotor axis between an installation location for the drive train component and a second location by means of a first drive arrangement of said displacement system, and
  a second drive arrangement mounted on said nacelle and comprising at least one winch, said second drive arrangement being separate to said displacement system and facilitating transportation of said drive train component between said second location and a lower level when connected to the drive train component independently of the operation of the displacement system.

The second drive arrangement may e.g. be arranged on top of the nacelle to support on a frame structure of the nacelle, it may be attached to/supported by a part of the nacelle inside the nacelle, or at any other appropriate locations.

The separate and independent operation of the second drive arrangement and the displacement system e.g. facilitates that one drive train component may be transported vertically by the second drive arrangement while the displacement system may be connected to another drive train component for transport of this component, thus facilitating a fast and advantageous way to install and perform service on drive train components in a nacelle.

Also, since separate drive arrangements are used for the displacement of the drive train components in the nacelle and vertical transportation of the drive train components, it is advantageously possible to use different means optimized for each step in the transportation of the drive train component, e.g. to achieve a space saving solution.

The second location in the nacelle is preferably substantially above an opening in the nacelle floor or below an opening in the nacelle roof, substantially below a support connection of the second drive arrangement thus facilitating easy connection of the drive train component to the support connection and vertical transport of the drive train component when connected to the second drive arrangement this is disclosed in more details later on.

The second drive arrangement my also be connected the drive train component at an intermediate location between the installation location and the second location, and the drive train component may afterwards be transported to be arranged above/below the opening by means of the displacement arrangement, displaced out through an opening in the rear end of the nacelle to be transported between the nacelle and the lower level or the like.

It is in general understood that the system may be utilized both for transporting a drive train component from a nacelle to the lower level such as ground level, and from the lower level to an installation location for the drive train component in the nacelle. Also, the transportation system may in other embodiments of the invention be utilized for transporting other parts of the wind turbine such as for example spare parts for drive train components and/or any other relevant parts between the ground and the nacelle, and internally in the nacelle by means of the second drive arrangement and/or the displacement system of the transportation system.

The displacement system preferably comprises a pair of transportation rails arranged parallel to each other with a horizontal distance between the rails to facilitate that the drive train components can be arranged between the rails and displaced downwards and upward between the rails. In alternative aspects one rail may be arranged e.g. underneath the drive train components, two pair of rails may be arranged parallel above each other, or the like. It is understood that any appropriate number of rails may be utilized in aspects of the invention.

In a preferred aspect of the invention, said displacement system comprises at least one displaceable slide for sliding or rolling along and being supported by said at least one transportation rail, each slide facilitating individual connection to said drive train component.

This facilitates a space saving and easy controllable way of transporting the drive train components in the nacelle in the longitudinal direction of the nacelle. Also, the individual connection facilitates that each slide may be connected to an appropriate connection location on the individual drive train component, independent of other slides of the displacement system.

The slide(s) are preferably connected to a predetermined connection location on the drive train component, e.g. at side parts of the drive train component. Alternatively, the slides may be connected to a connection location e.g. substantially at a bottom part of the drive train component.

The slides may be controlled by a control arrangement controlled by an operator to be arranged opposite to a connection location of the drive train component to be transported. Each slide is then connected to the respective suitable connection location on the drive train component.

A slide may in an embodiment of the invention be utilized for transporting more than one drive train component in the nacelle, e.g. a slide is used in turn for transporting both, generator, gear and main bearing components. Alternatively, the rail may comprise a slide for drive train component. Also, a transportation rail may comprise two or more slides for transporting and supporting a drive train component, or any other appropriate number of slides.

In an advantageous aspect of the invention, said at least one slide comprises a lifting arrangement facilitating lifting said drive train component away from a support for the drive train component in said nacelle, and lowering said drive train component towards the support.

The lifting arrangement facilitates that for example when the slides are properly connected to the drive train component (and is dismantled from other parts in the nacelle), the lifting arrangement may lift the component to be supported only by the displacement system. This may result in a space saving and time saving solution. The lifting arrangement preferably comprises one or more hydraulic cylinders, but it may also comprise a spindle actuated by an electric motor, it may comprise a jack or any other appropriate lifting arrangement facilitating that the drive train component may be lifted to support on the displacement arrangement.

When the drive train component has been lifted, it can then be transported in the longitudinal direction of the nacelle, along the rails, while being supported by the displacement system.

The said support for the drive train component preferably comprises the support for supporting and preferably also fixating (by means of proper fixation equipment) the drive train component during operation of the wind turbine.

In another aspect of the invention, the rails of the displacement system may facilitate support of drive train components when the drive train components are installed at the nacelle so that the drive train components are also supported by the rails during operation.

In an aspect of the invention, said first drive arrangement comprises a screw spindle with at least one thread connected to an inner thread of said slide, for displacing the drive train component along the rails.

This facilitates an advantageous and controllably way of displacing the drive train component along the rails.

Preferably, the drive train component connected to the displacement system can be displaced in the longitudinal direction of the nacelle by rotating the screw spindle around it longitudinal axis. Alternatively, the slides may comprise a rotatable nut with an inner threat that engages with thread/s of the spindle, so by rotating the rotatable part while keeping the spindle fixed, the slide and thus the drive train component is displaced along the spindle while being supported by the rail. In the last mentioned embodiment, each slide may comprise a drive arrangement for driving the nut, or a drive arrangement in the nacelle may be connected to selected slides of the rails.

In an advantageous aspect of the invention, an opening in the nacelle is provided in vertical alignment with said second location, facilitating transportation of said at least one drive train component vertically through said opening from said second location by means of said second drive arrangement.

This is advantageous in that a drive train component supported by the rail(s) may be transported directly from being supported on the rail(s) and vertically through the opening in the nacelle. Thus, faster and more uncomplicated transportation of the drive train components is facilitated.

Preferably, if the displacement system comprises more than one rail, each of the rails are arranged to extend along the sides of the opening in the nacelle.

This facilitates that the drive train component may be transported in over/under the opening by means of the displacement system and is thus arranged advantageously at the correct location to be transported by the second drive arrangement. Also this facilitates that the drive train component may be connected to the displacement system in an advantageous way when being transferred from the second drive arrangement to slides of the displacement system. It is understood that the opening in the nacelle is of a size that facilitates that drive train components can be transported between the inside of the nacelle and the outside of the nacelle, through the opening.

Preferably, the said opening is provided in the nacelle floor.

This is advantageous in that the drive train component may be transported vertically downwards instead of being lifted upwards through a hole in the nacelle roof by means of e.g. a external large crane or a crane such as a swing crane fixed to the outside of the nacelle. When transporting the drive train component through the opening in the floor, a second drive arrangement arranged in the nacelle may be used. Alternatively, the opening may as explained above be an opening in the nacelle top/roof. The opening is preferably arranged in the nacelle floor behind the tower.

If the displacement system comprises more than one rail, and the opening is provided in the nacelle floor, the rails are preferably arranged with a horizontal distance allowing the drive train component to pass vertically between the rails when supported by the second drive arrangement and lifted to be free from the displacement arrangement.

In a preferred aspect of the invention, at least a part of said transportation rails is fixed to a frame structure of said nacelle.

This may be advantageous in that the frame structure of the nacelle is a strong part of the nacelle structure, thus enabling support of the heavy components in the nacelle. Alternatively, the transport rails may be supported by e.g. the floor in the nacelle, e.g. by means of floor support supporting the transportation rails and creating a distance between the floor level in the nacelle and the transportation rails.

Preferably, the rails are arranged over the nacelle floor with a distance to the floor so that the rails are arranged opposite to the sides of the drive train components in the nacelle, but the rails may also be arranged directly on the floor or may even be substantially plane with the floor level in the nacelle.

In an aspect of the invention, said second drive arrangement can be removed when not in use and lowered to a lower level by use of another permanently mounted crane of said wind turbine.

Cranes and other lifting means for lifting the heavy components of a wind turbine, such as the drive train components, are cost expensive. By facilitating that the second drive arrangement, or at least parts thereof, can be removed to be used in another location, a more cost effective solution is achieved. In another aspect of the invention, the second drive arrangement for transporting the drive train components between the nacelle and the ground may be a permanently installed drive arrangement in/at the nacelle.

In an advantageous aspect of the invention, said second drive arrangement is displaceable in the longitudinal direction of said nacelle.

This may be advantageous e.g. in that the second drive arrangement may thus be displaced to a location e.g. away from the opening in the nacelle floor (or roof) to be connected to or released from the drive train component. Also, the second drive arrangement may be utilized for other tasks in the nacelle beyond transporting drive train components between the nacelle and a lower level. The second drive arrangement may in such a scenario be controlled by e.g. an electric motor, hydraulic actuators or the like for displacing the second drive arrangement and may e.g. roll on wheels, rollers or the like.

In an advantageous aspect of the invention, said drive train component can be temporarily stored at a storage location in the nacelle by means of said displacement system.

This is advantageous in that if for example the gear in a nacelle needs to be serviced at ground level, or has to be displaced, the generator may be transported to the storage location to facilitate access to the gearbox. The storage location is preferably located at the rear part in the nacelle, and the displacement may transport the dismantled generator to this storage location at the other side of the opening in the nacelle floor (or nacelle roof) and temporarily leave it there to facilitate service on the gear.

The invention furthermore relates to a wind turbine nacelle with a transportation system as described above.

It is in general understood that a slide may comprise one or more rolls for rolling on a track of the rail or that the rail may comprise rolls. Alternatively, the slide may be in direct contact with the track, and at least in such an aspect, the contact surface between the rail and the slide preferably comprises a low friction layer to reduce friction during the movement of the slide along the rail.

Furthermore, the invention relates to a method of transporting a drive train component of a wind turbine comprising a tower and a nacelle arranged on top of said tower, said method comprising the steps of:
individually connecting a drive train component to at least one slide supported by a transportation rail of a displacement system, the at least one transportation rail being arranged to support the drive train component during displacement thereof, displacing the drive train component inside the nacelle along said at least one transportation rail parallel to the rotor axis between an installation location for the drive train component and a second location by means of a first drive arrangement of said displacement system while being supported by said slides,
connecting said drive train component to a separate second drive arrangement mounted on the nacelle and comprising at least one winch, and
vertically transporting the drive train component between the nacelle and a lower level by means of said second drive arrangement, the second drive arrangement operating independently of the operation of the displacement system.

Advantageously, said method may in an aspect of the invention comprise that the said transportation by means of the second drive arrangement comprises the step of transporting the drive train component through an opening in the nacelle floor.

In a preferred aspect of the invention, said method comprises the step of lifting said drive train component by means of a lifting arrangement of said displacement system.

In general it is also to be understood that the method may for example also comprise one or more of the following steps:
connecting the drive train component to a slide of the transportation rails,
displacing the slides along the drive train component to be aligned at a correct position in relation to connection locations at the drive train component,
arranging the drive train component over an opening in the nacelle floor while being supported by the displacement system,
lifting the drive train component free from the slides and removing connection parts,
as well as any other advantageous step derivable from this document.

Furthermore, the invention relates to a transportation system for transporting at least one drive train component of a wind turbine nacelle, said transportation system comprising at least one pair of transportation rails being arranged to support said at least one drive train component during displacement thereof,
said transportation rails facilitating displacement of the drive train component substantially parallel to the rotor axis of the nacelle between an installation location for the drive train component and a second location vertically aligned with an opening in the nacelle floor, and
said transportation system facilitating transportation of said at least one drive train component vertically through the opening between the rails by means of a drive arrangement.

It is in general understood that this aspect may be combined with any of the earlier mentioned aspects of the invention as well as other aspects disclosed in this document. E.g. it is preferred that each rail comprises a slide to facilitate the displacement of the drive train component along the rail.

Thus, it is possible to support the drive train component by means of the rails above the opening, and transfer the drive train component directly to be supported by the drive arrangement and vice versa. Thereby e.g. a time saving solution is achieved. It is understood that at least for this particular embodiment, the drive arrangement for displacing the drive train component while supported by the rails and for vertically displacing the drive train component between the rails may be the same drive arrangement. An appropriate number of pulleys may thus be implemented in the nacelle to guide the support connection of the drive arrangement to facilitate the displacement on the rails. For example, the drive arrangement may be arranged over the opening and a pulley may be arranged at the rear end side of the opening in the nacelle floor so that the support connection is guided by this pulley and is connected to the end of the drive train component facing the opening. By winding the support connection, the drive train component supported by the rails is pulled towards the opening. It is of cause to be understood that a similar pulley may be arranged at the side of the opening in the floor facing the hub end of the nacelle for guiding a support connection during displacement of a drive train component supported by the rails from the opening towards the installation location for the component. Alternatively, the displacement along the rails and the vertical displacement of the drive train component towards the lower location may be handled by separate drive arrangements as explained earlier.

FIGURES

Figure 2:
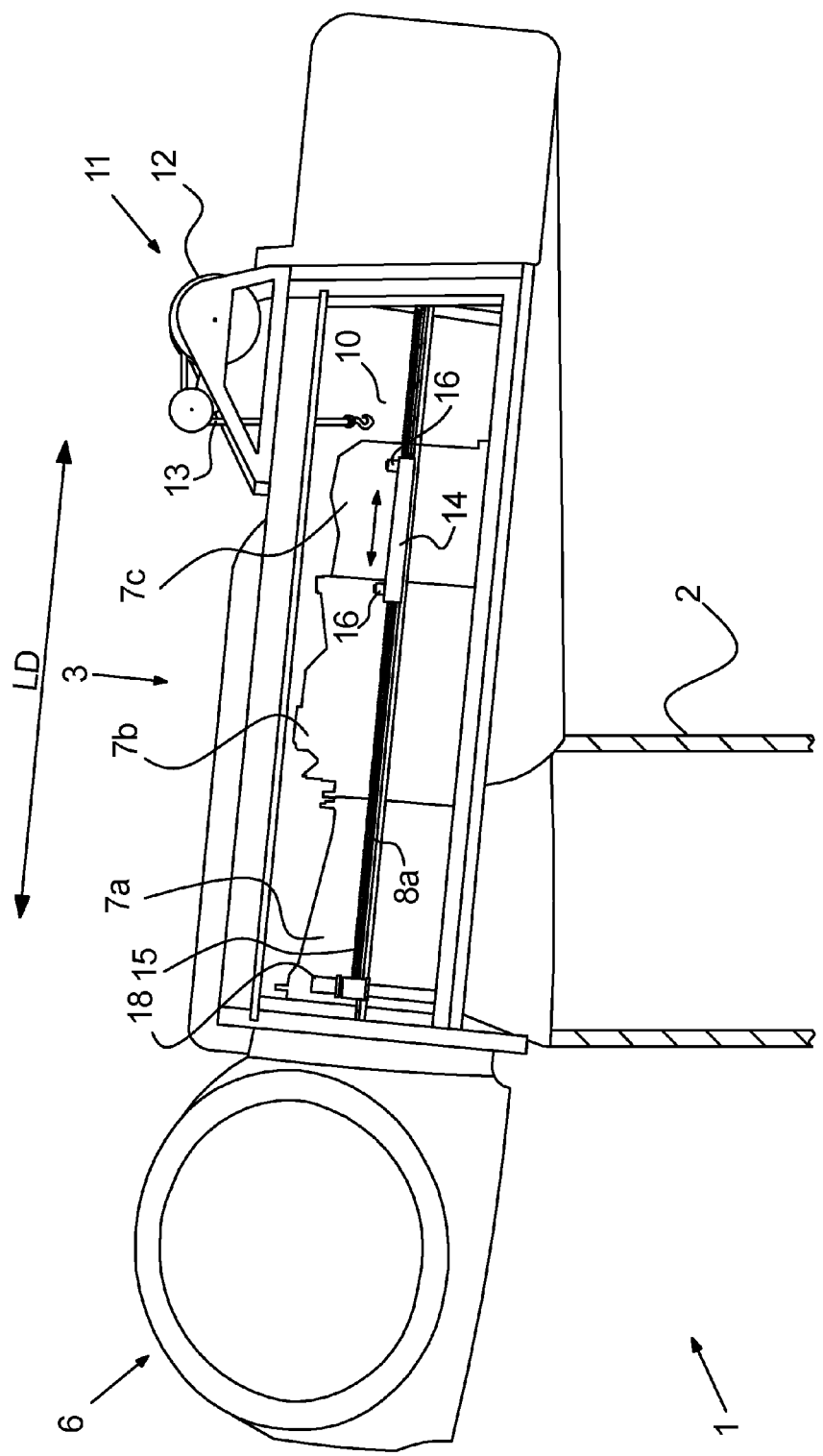
Figure 5:
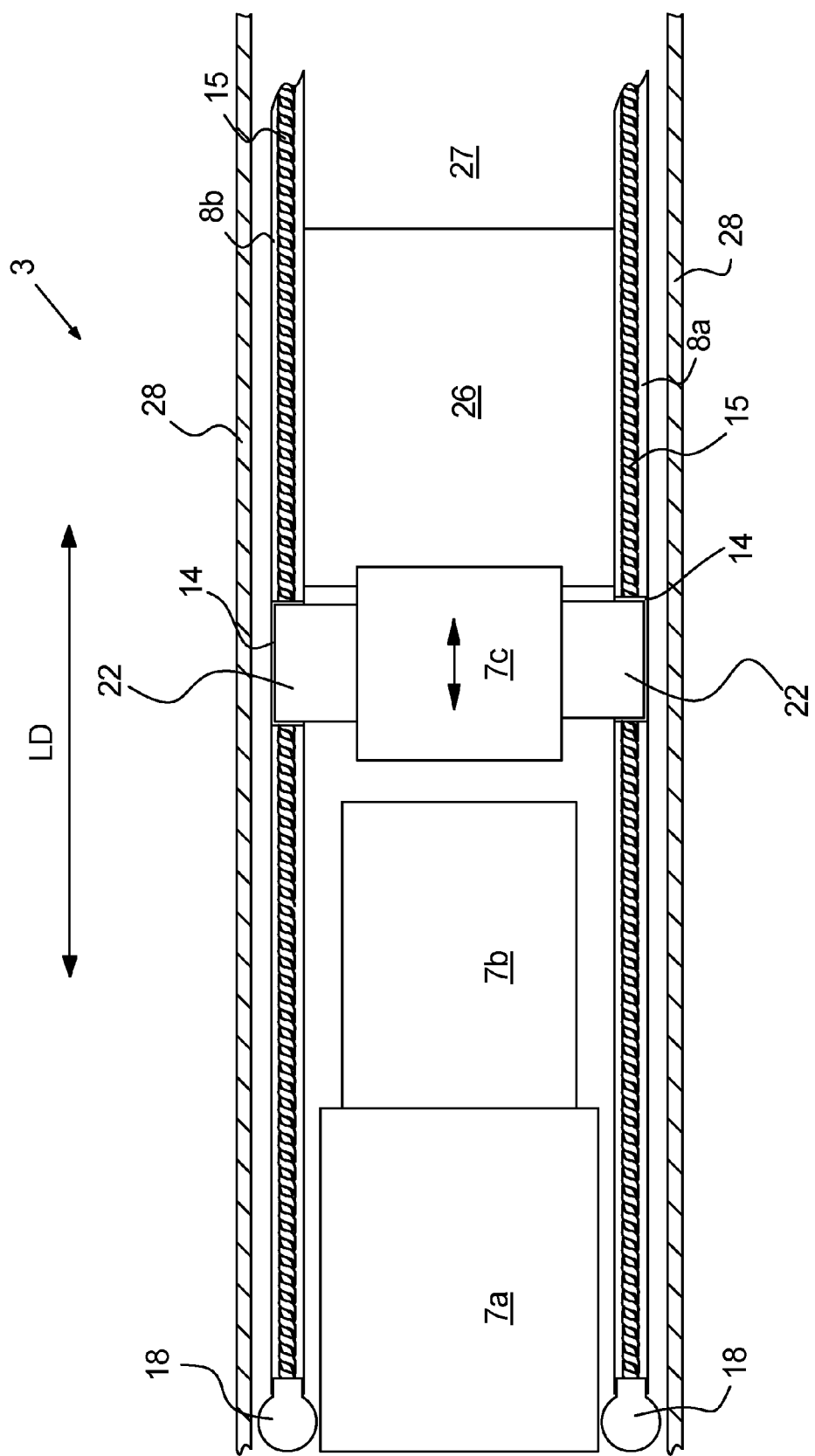
Figure 6:
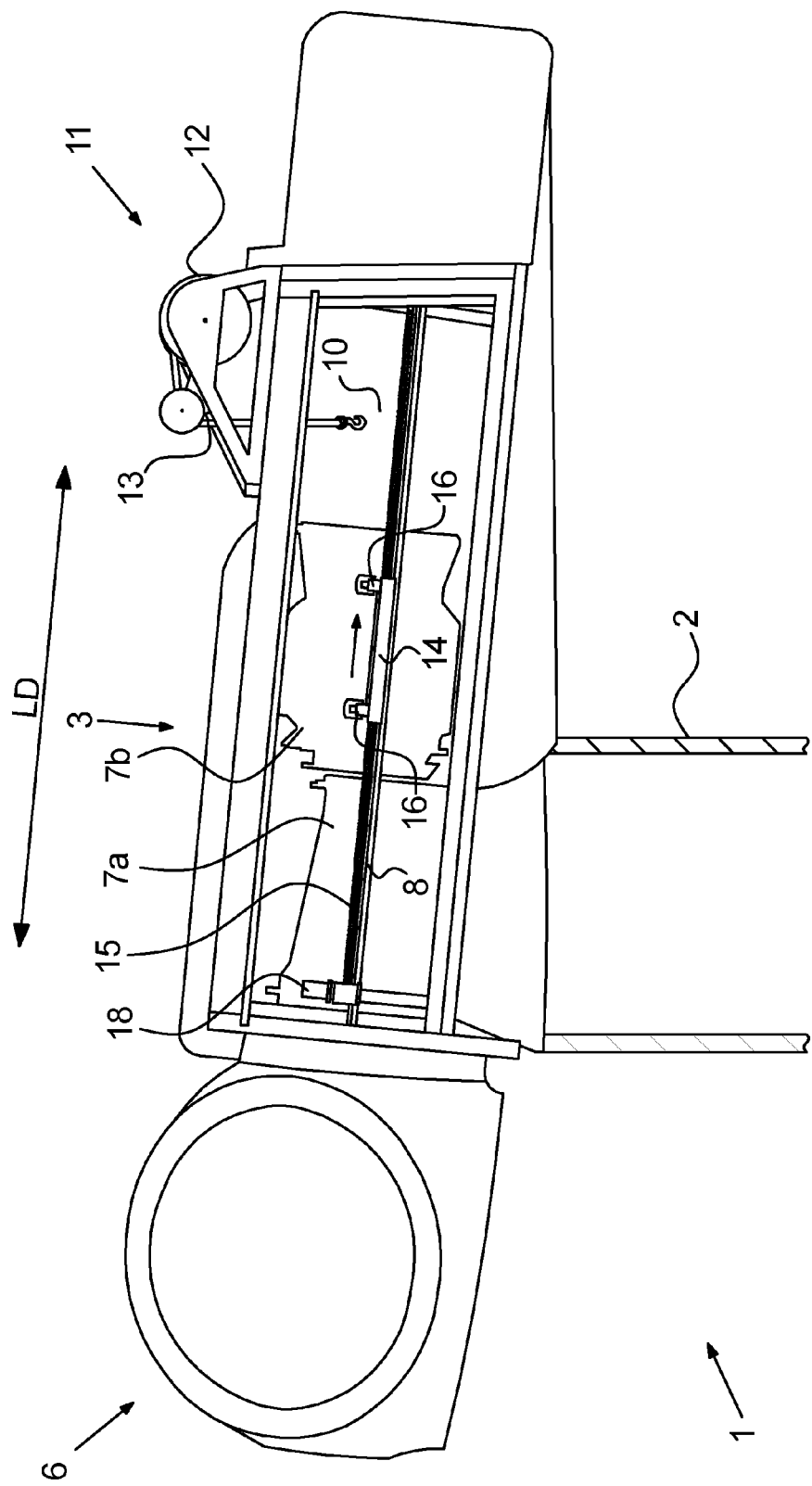
Figure 7:
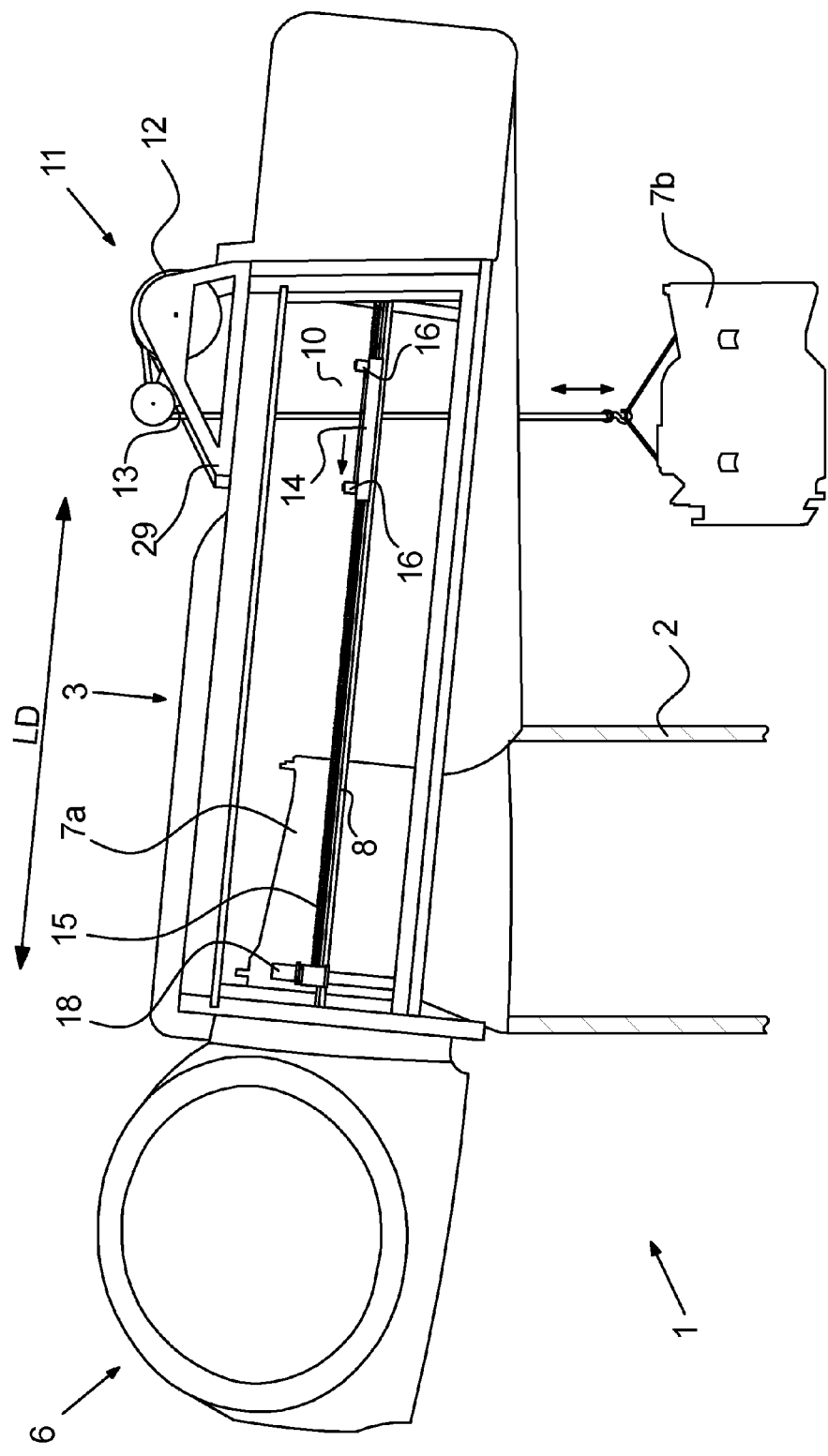
Figure 8:
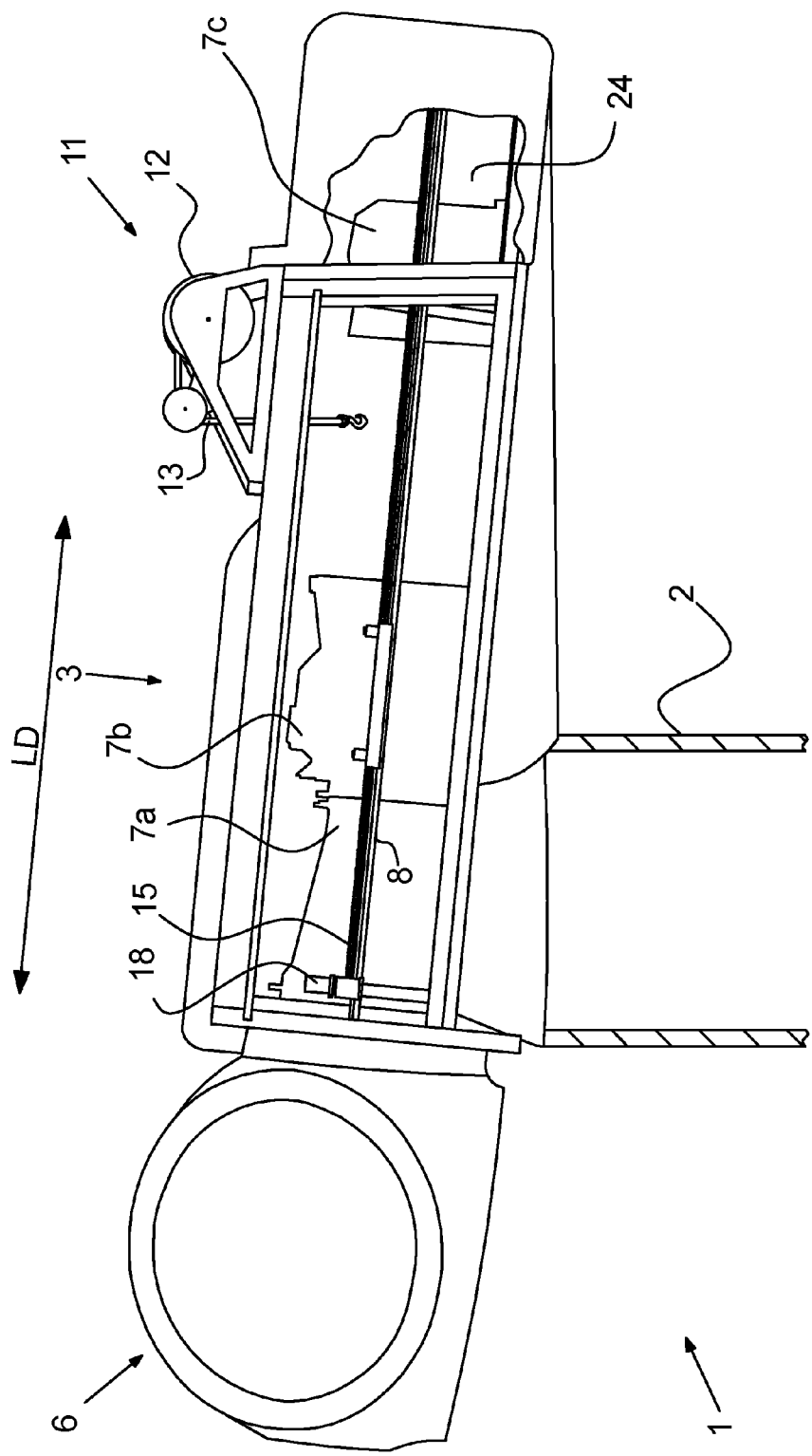
Figure 9:
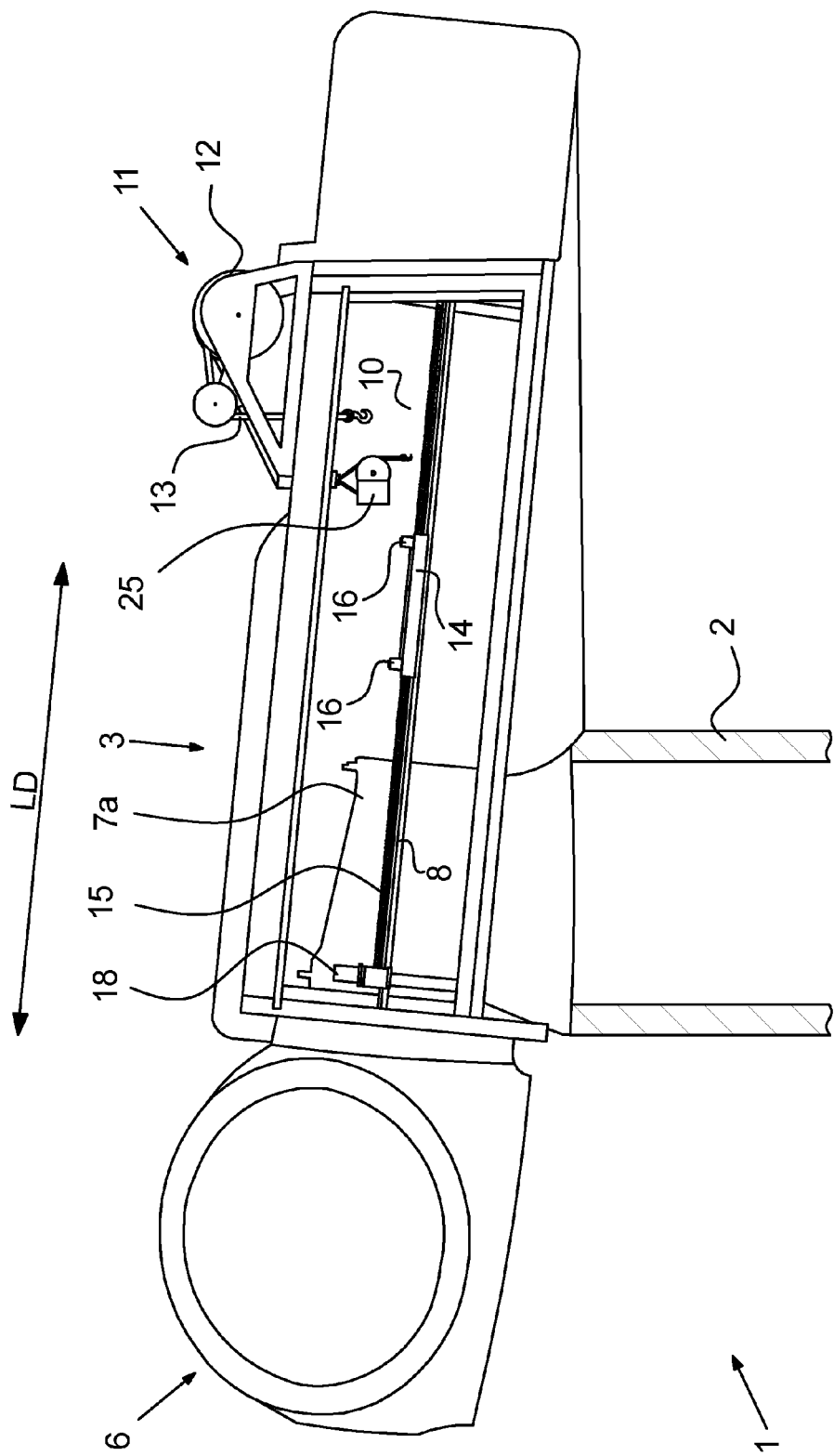
Figure 10:
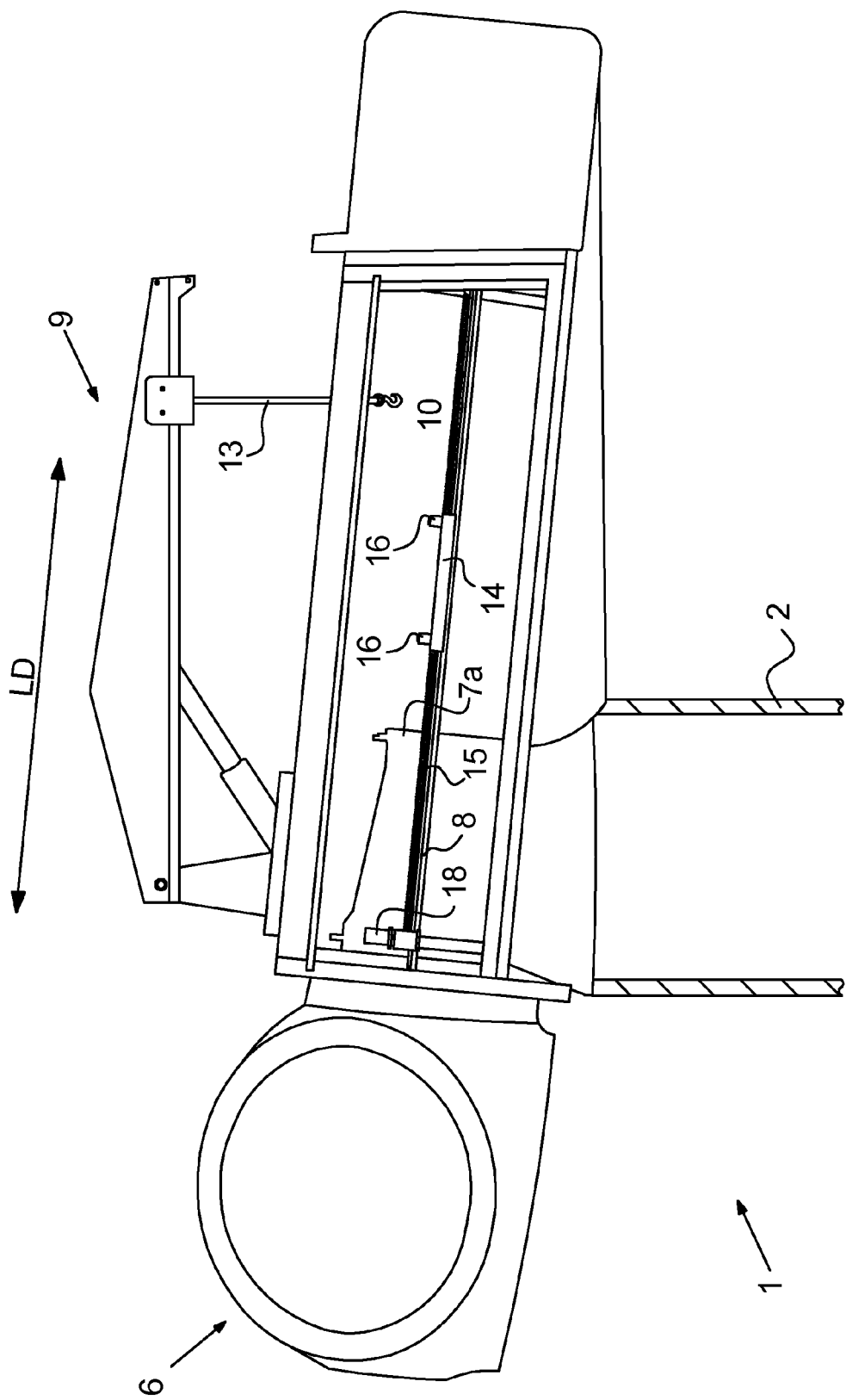

A few exemplary embodiments of the invention will be described in the following with reference to the figures, of which FIG. 1 illustrates a large modern wind turbine as known in the art, seen from the front, FIG. 2 illustrates a nacelle of a wind turbine seen from the side comprising drive train components and a transportation system according to an aspect of the invention, FIG. 3, 3a illustrates a cross sectional view of a rail with a slide seen from the front, according to embodiments of a displacement system of the transportation system according to the invention, FIG. 4 illustrates a drive train component seen from an end of the component and being connected to a pair of rails of a displacement system of the transportation system according to an embodiment of the invention, FIG. 5 illustrates an embodiment of the invention where rails of the displacement system extends in the nacelle along the side of and above an opening in the nacelle floor, FIG. 6 illustrates an embodiment of the invention where a drive train component is lifted from the support/floor in a nacelle and is displaced in the longitudinal direction of the nacelle by means of a displacement arrangement towards a second location, FIG. 7 illustrates an embodiment of the invention where a drive train component is lowered towards the ground through an opening in the nacelle floor by means of a second drive arrangement of the transportation system, FIG. 8 illustrates an embodiment of the invention where the nacelle comprises a storage location for temporary storage of a drive train component, FIG. 9 illustrates an embodiment of the invention where the nacelle comprises a further permanent crane, and FIG. 10 illustrates an embodiment of the invention where the second drive arrangement of the transportation system comprises a swing crane on the nacelle.

DETAILED DESCRIPTION

FIG. 1 illustrates a modern wind turbine 1 as known in the art comprising a tower 2 and a wind turbine nacelle 3 positioned on top of the tower 2. The wind turbine rotor 4, comprising three wind turbine blades 5 mounted on a hub 6, is connected to the nacelle 3 through a low speed shaft which extends out of the front of the nacelle 3.

FIG. 2 illustrates an example of a wind turbine nacelle of a wind turbine seen from the side, where a side wall of the nacelle 3 is removed/made transparent so that the internal of the nacelle 3 is visible. The wind turbine blades are not illustrated in FIG. 2.

The nacelle 3 comprises drive train components, in the present example comprising a main bearing housing 7a, a gear 7b and a generator 7c. The nacelle 5 furthermore comprises a transportation system for transporting the drive train components 7a, 7b, 7c between an installation location for the respective drive train components 7a, 7b, 7c and ground level.

The transportation system comprises a displacement system preferably comprising at least one pair of transportation rails 8a, 8b extending in the longitudinal direction of the nacelle alongside the drive train components, where one rail 8a is arranged at one side of the drive train components 7a, 7b, 7c and another rail 8b is arranged at the other side of the drive train components 7a, 7b, 7c. In FIG. 2, only one transportation rail 8a at one side of the drive train components 7a, 7b, 7c is visible, but it is understood that another transportation rail 8b is arranged at the other side of the drive train components 7a, 7b, 7c. It is furthermore understood that the displacement system in other embodiments of the invention may comprise two, three or even more pair of rails 8a, 8b, as well as only one rail.

The displacement arrangement facilitate displacement of drive train components 7a, 7b, 7c inside the nacelle 3 between the installation location for the respective drive train components 7a, 7b, 7c and a second location 10 in the nacelle 3 while being displaced along a track 21 of the rail 8. The rails 8a, 8b facilitate that the drive train components 7a, 7b, 7c can be guided to slide in the longitudinal direction LD of the nacelle 3 while supported by the rails 8a, 8b. The longitudinal direction of the nacelle is substantially parallel to the rotor axis of the wind turbine drive train component so that the drive train components can be transported substantially parallel to the rotor axis between an installation location for the respective drive train component and a second location 10.

The second location 10 is preferably a location substantially opposite to an opening in the nacelle floor (or roof) as described later on, but it may also be another appropriate location in the nacelle 3.

The transportation system furthermore comprises a second drive arrangement 11, e.g. being a part of a crane 9, where the second drive arrangement 11 comprises one or more winches 12 for transporting a drive train component 7a, 7b, 7c vertically from the nacelle 3 to a lower location. The second drive arrangement 11 is arranged to facilitate vertical transport of a drive train component 7a, 7b, 7c between the nacelle 3 and a lower location, e.g. the ground, a platform, a vessel or the like. The one or more winches (12) facilitate winding and unwinding a support connection 13 such as e.g. one or more ropes, one or more steel cables, or any other appropriate support connection. The winch(es) 12 may be rotated by e.g. an electric motor (not illustrated) of the second drive arrangement to wind and unwind the support connection(s) 13.

In an embodiment of the invention, the second drive arrangement 11 is supported by the frame structure of the nacelle and is arranged substantially above the second location 10, preferably above an opening in the nacelle floor as described later on. For example, the second drive arrangement 11 may comprise a frame structure 29 resting on/connected to the top of the frame structure of the nacelle 3 as illustrated. The second drive arrangement 11 may also in an embodiment of the invention be displaceable in the longitudinal direction of the nacelle 3, e.g. by being displaceable along a rail system (not illustrated) for this purpose. This may for example be advantageous if the second location 10 in the nacelle is not located vertically aligned with the opening in the nacelle floor or roof, to achieve supporting a drive train component at advantageous locations, e.g. near the centre of gravity of the individual drive train components or the like.

The second drive arrangement 11 and the displacement system facilitate individual control so that the displacement system may operate independently of the second drive arrangement. For this purpose, the displacement system comprises its own first drive arrangement. This drive arrangement may comprise hydraulic actuators, a chain drive, a winch system, a spindle with a nut as described later on, or any other appropriate drive arrangement facilitating driving e.g. a slide supported by the rail to be displaced along the rail. Also, the drive arrangement may comprise a combination of different types of drive arrangements. The drive arrangement facilitates displacement of a drive train component 7a, 7b, 7c between its installation location and the second location 10 when the component is arranged to support on the rails 8a, 8b of the transportation system.

In the present example, the drive arrangement of the displacement system comprises threaded spindles 15 arranged along each rail 8a, 8b, where the spindle 15 can be rotated by an electric motor 18 of the drive arrangement so as to drive a slide 14 along the rails 8a, 8b. Thus, the slide is directly driven. Each slide 14 preferably comprises one or more lifting arrangements 16 to facilitate a lifting and lowering of a drive train component 7a, 7b, 7c. This embodiment is described in more details in relation to FIGS. 3, 3a and 4.

FIG. 3 illustrates a cross sectional view of a rail 8a with a slide 14 seen from the front, according to an embodiment of the invention. The slide 14 is displaceable in the longitudinal direction of the rail 8a while being supported by the rail 8a on a track 21 of the rail, where the displacement in this example is facilitated by rotating a threaded spindle 15 which interacts with an internal thread (not illustrated) of the slide 14. Thus, by rotating the spindle around its longitudinal axis, the drive train component supported by the slide 14 is displaced in the longitudinal direction of the nacelle 3.

In an embodiment of the invention, the internal thread may facilitate to be arranged in an idling state where the internal thread may rotate along with a rotation of the spindle 15 so that the slide 14 is not displaced along the rail 8 while rotating the spindle 15, and in another locked state where the internal thread may be locked so that a rotation of the spindle 15 results in a displacement of the slide 14 along the rail 8a. This e.g. facilitates that the rail 8a may comprise two or more slides 14 that may be operated individually by arranging the internal thread in an idling or locked state.

In another embodiment of the invention, the internal thread of the slide 14 may be a part of a rotatable nut (not illustrated) of the slide 14, so that when rotating the rotatable nut in relation to the spindle 15 while keeping the spindle 15 fixed, the slide 14 is displaced along the rail 8a. Each slide 14 may in this embodiment be connected individually to a drive arrangement for rotating the internal thread of each slide. This embodiment also facilitates that the rail 8 may comprise two or more slides 14 that may be operated individually.

In general, it is preferred that the slides 14 may be controlled by the same control arrangement (not illustrated) facilitating a simultaneous control of the slides at each side of the supported drive train component. Also, the control arrangement may facilitate individual control of the slides 14 at each rail. For example, the slides may be controlled individually by rotating each their appurtenant spindle 15 individually to be arranged in a correct position to be connected to a drive train component 7a, 7b, 7c, and afterwards, the slides 14 may be controlled to facilitate a simultaneous displacement of the drive train component 76a, 7b, 7c to the second location 10 by rotating the spindles individually and with substantially the same speed. The control arrangement may comprise one or more sensors connected to the displacement system to monitor the displacement of the slides, e.g. to assure that one slide is not displaced faster than another slide. For this purpose, the control arrangement may also facilitate synchronization of the displacement system.

The rail 8a is preferably supported by the frame structure 19 of the nacelle 3 e.g. by means of one or more bolts/screws, by welding by resting on top of a part of the frame structure 19 and by means of any other suitable connection. Alternatively, or additionally, the rail 8 may be supported by the floor of the nacelle and/or another part of the wind turbine.

The slide 14 in a preferred embodiment of the invention comprises one or more lifting arrangements 16 for lifting a drive train component from its support at the installation location and lowering the drive train component onto its support at the installation location. For example, the slide 14 may comprise two lifting arrangements as shown in FIG. 2, but it may also comprise only one, three, four or even more lifting arrangements 16. This lifting arrangement 16 may e.g. comprise a pair of hydraulic cylinders that, when connected to the drive train component, may lift and lower the component by means of a displaceable part 17.

In an embodiment of the invention as illustrated in FIG. 3, the slide 14 comprises a guiding part 20 for guiding the slide 14 along the rail 8a. This guiding part may for example comprise one or more parts extending past and preferably also underneath a part of the rail 8 to assure that the slide 14 is kept as intended on the track 21 of the rail 8. The guiding part 20 may also or instead comprise one or more elevations as illustrated in FIG. 3a. These elevations may guide the slide 14 along the rail in a recess extending in the longitudinal direction of the rail, e.g. recesses in the surface of the track 21. Alternatively or additionally, the rail may comprise the elevations and the slide 14 may comprise a matching recess.

FIG. 4 illustrates an embodiment of the invention, where a drive train component 7 (i.e. any of the drive train components 7a, 7b, 7c of the wind turbine) is connected to a pair of rails 8a, 8b of the displacement system, in this example by means of a connection part 22 that connects the displaceable parts 17 of the lifting arrangement 16 of the slides 14 with sides of the drive train component 7x. In FIG. 4, the drive train component 7x is lifted by the lifting arrangements 16 to be supported only by the displacement arrangement, and to be displaced in the longitudinal direction of the nacelle by means of the displacement arrangement. The displacement system may also comprise an alignment system for aligning the drive train component when the component is to be installed in the nacelle, e.g. to facilitate horizontal and/or vertical alignment with another drive train component, alignment with holes for bolts to fixate the drive train component or the like.

The connection part 22 may be a removable part that can be removed during normal operation of the nacelle 3, it may be an inherent part of the drive train component or the like.

In an embodiment of the invention, the connection part 22 extend out over the rail tracks so that the lifting arrangement(s) 16 of the displacement system in an easy way may be connected to the drive train component by arranging the slide 14 underneath the connection part 22 and displacing the displaceable part 17 upwards to lift the component.

The rails 8a, 8b are preferably arranged with a distance to the nacelle floor to enable that the slides are arranged substantially opposite to side parts of the nacelle 3 and to enable more easy connection to drive train components in the nacelle 3. In other embodiments of the invention, the rails 8 may however be arranged near the nacelle floor 27 e.g. to support on the floor or the like.

FIG. 5 illustrates an embodiment of the invention where the rails 8a, 8b of the displacement system extends substantially parallel to side walls 28 of the nacelle 3 in the longitudinal direction LD of the nacelle and past an opening 26 in the nacelle floor 27. This facilitates that a drive train component 7a, 7b, 7c can be supported by the displacement arrangement to hang substantially above the opening 26 in the nacelle floor 27, so that the second drive arrangement 11 may lift the supported drive train component from being supported by the rail(s) of the displacement system and through the opening in the floor. For this purpose, it is preferred that the rails 8a, 8b as illustrated extend along the nacelle wall 28 above and past the opening 26 in the nacelle floor 27. In another embodiment of the invention, the opening may be an opening in the nacelle roof. The rails are thus parallel arranged with a horizontal distance between the rails that is larger than the width of the drive trans components, to facilitate that drive train components can be displaced vertically between and past the rails 8a, 8b, e.g. through an opening in the nacelle floor, to arrange the drive train component on a support for the drive train component at the installation location or the like.

FIG. 6 illustrates an embodiment of the invention where a drive train component, in this case the gear 7b, has been dismantled, is lifted from the support/floor at its installation location and is displaced in the longitudinal direction LD of the nacelle 3 towards the second location 10 in the nacelle 3 while the drive train component 7b is supported and guided by rails 8a, 8b of the displacement system. It is understood that the generator in a previous step has been dismantled and removed from the nacelle, preferably by means of the transportation system according to the invention.

In FIG. 7 the drive train component has reached the opening in the nacelle floor, is connected to the support connection 13 of the second drive arrangement and is lowered towards the lower level. It is in general understood that while one drive train component 7a, 7b, 7c may be transported by the second drive arrangement 11, the displacement system may be used to collect or install another drive train component 7a, 7b, 7c in the nacelle 3.

One non limiting method of transporting a drive train component 7a, 7b, 7c by means of the transportation system may thus comprise the following steps a)-g):

a) Dismantling a drive train component 7a, 7b, 7c in the nacelle 3,
b) Connecting slides 14 of transportation rails 8a, 8b to the dismantled drive train component,
c) Lifting the drive train component from the support at the installation location by means of a lifting arrangement 16,
d) Connecting a second drive arrangement 11 to the dismantled drive train component,
e) Sliding/displacing the drive train component by the slides 14 to be arranged over an opening 26 in the nacelle floor 27,
f) Lifting the drive train component from the slides by means of the second drive arrangement, and
g) Transporting the drive train component towards the ground by use of the second drive arrangement 11.

It is of cause to be understood that the above steps may be performed in any other appropriate order. One example may be that step d) may be performed before step a), b) or c) as well as after step e)

This method may be utilized substantially reversed when installing a drive train component 7a, 7b, 7c in the nacelle 3, e.g. as described in the following steps h)-n)

h) Transporting the drive train component vertically from a lower location to the nacelle 3 by means of the second drive arrangement of the transportation system,
i) Connecting the drive train component to the slide(s) 14 in the nacelle 3,
j) Disconnecting the second drive arrangement 11 from the drive train component,
k) Sliding/displacing the drive train component by means of the slides 14 towards the installation location for the respective drive train component,
l) lowering/arranging the drive train component onto an appropriate support at an installation location for the component by means of lifting arrangement(s) 16,
m) Disconnecting slides 14 of transportation rails from the dismantled drive train component,
n) Finishing install of the drive train component.

Likewise, the above steps may be performed in any other appropriate order.

FIG. 8 illustrates an embodiment of the invention wherein the nacelle 3 comprises a storage location 24 at the rear of the nacelle 3 for temporary storage of a drive train component. In the embodiment, the generator 7c is temporarily stored at this temporary storage location 24 in the rear part of the nacelle while the displacement arrangement is utilized for collecting or installing another drive train component to be lowered down towards the ground for service or exchange by means of the second drive arrangement. E.g. in such an embodiment of the invention, it may be advantageous that rails 8a, 8b of the displacement arrangement comprises more than one independent operateable slide 14 as described earlier so that one pair of slides 14 may keep the component at the storage location while another pair of slides collects another drive train component.

FIG. 9 illustrates an embodiment of the invention wherein the nacelle comprises a further permanent crane 25. This crane 25 may be utilized for transporting smaller components between ground level and the nacelle 3. Furthermore, the permanent crane 25 in the nacelle 3 may be utilized for transportation of e.g. the second drive arrangement 11 and other parts between ground level and the nacelle 3, in embodiments of the invention where the second drive arrangement 11 of the transportation system is not a permanently installed crane in the wind turbine nacelle.

The permanent crane 25 may comprise a winch that may be displaced in the longitudinal direction LD of the nacelle 3 along a rail in the top of the nacelle as illustrated in FIG. 8, but it may also be a swing crane with a crane boom/jib, where the crane is installed in the wind turbine e.g. at the main bearing housing, at the floor of the nacelle, at the frame structure of the nacelle or the like.

FIG. 10 illustrates an embodiment of the invention where the second drive arrangement 11 is a part of a swing crane 9 facilitating vertical transportation of a drive train component 7a, 7b, 7c between the nacelle 3 and ground level. The crane 9 may e.g. access the drive train component 7a, 7b, 7c at the second location 10 through an opening in the nacelle roof, lift the drive train component from the displacement system out over the top of the nacelle 3 and towards the ground. Also, the nacelle 3 may comprise both an opening in the roof of the nacelle 3 and an opening 26 in the nacelle floor, and the crane 9 may in such an embodiment of the invention access the component through the opening in the roof and transport the component between the nacelle and the ground through the opening 26 in the nacelle floor.

The swing crane may as illustrated be arranged on top of the nacelle, it may be installed inside the nacelle e.g. at the main bearing housing, at the floor of the nacelle, at the frame structure of the nacelle 3 or the like.

In a further embodiment of the invention which is not illustrated, the crane 9 may be a large external crane standing on the ground, and also in such an embodiment, the nacelle 3 may facilitate access to the second location 10 through an opening in the roof of the nacelle 3.

In general, it is to be understood that the invention is not limited to the particular examples described above but may be adapted in a multitude of varieties within the scope of the invention, as specified in the claims. Furthermore, it is to be understood that two or more embodiments and/or features illustrated in the figures may also be combined in a multitude of varieties to achieve different embodiments not directly described in this document.

LIST

1: Wind turbine.
2: Wind turbine tower.
3: Nacelle.
4: Wind turbine rotor.
5: Wind turbine blades.
6: Hub.
7a: Main bearing housing.
7b: Gear.
7c: Generator.
8, 8a, 8b: Transportation rail.
9: Swing crane of transportation system.

10: Second location.
11: Second drive arrangement for at least vertically displacing a drive train arrangement between the nacelle and a lower level
12: Winch of second drive arrangement of the crane of the transportation system.
13: Support connection(s) of second drive arrangement
14: Slide
15: Spindle
16: Lifting arrangement of slide
17: Displaceable parts of lifting arrangement of slide
18: First drive arrangement, e.g. a motor, for rotating spindle,
19: Frame structure of nacelle.
20: Guiding part of slide.
21: Track of transportation rail.
22: Connection part for connecting drive train component and. displacement arrangement.
24: Storage location in nacelle for temporary storage of a dismantled drive train component.
25: Permanent crane of nacelle.
26: Opening in the nacelle floor.
27: Nacelle floor.
28: Nacelle side wall.
29: Frame structure of crane supporting on top of the nacelle.

The invention claimed is:

1. A transportation system for transporting at least one drive train component of a wind turbine comprising a tower and a nacelle arranged on the top of the tower, the transportation system comprising:
  a displacement system comprising one or more transportation rails being arranged to support at least one drive train component during displacement thereof,
  the displacement system facilitating displacement of the drive train component substantially parallel to the rotor axis between an installation location for the drive train component and a second location by means of a first drive arrangement of the displacement system, and
  a second drive arrangement mounted on the nacelle and comprising at least one winch, the second drive arrangement being separate from the displacement system such that the at least one winch remains stationary with displacements of the drive train component by the first drive arrangement, and the second drive arrangement facilitating transportation of the drive train component between the second location and a lower level when connected to the drive train component independently of the operation of the displacement system.

2. The transportation system according to claim 1, wherein the displacement system comprises at least one displaceable slide for sliding or rolling along and being supported by the at least one transportation rail, each slide facilitating individual connection to the drive train component.

3. The transportation system according to claim 2, wherein the at least one slide comprises a lifting arrangement facilitating lifting the drive train component away from a support for the drive train component in the nacelle, and lowering the drive train component towards the support.

4. The transportation system according to claim 2, wherein the first drive arrangement comprises a screw spindle with at least one thread connected to an inner thread of the slide, for displacing the drive train component along the rails.

5. The transportation system according to claim 1, wherein an opening in the nacelle is provided in vertical alignment with the second location, facilitating transportation of the at least one drive train component vertically through the opening from the second location by means of the second drive arrangement.

6. The transportation system according to claim 5, wherein the opening is provided in the nacelle floor.

7. The transportation system according to claim 1, wherein the second drive arrangement can be removed when not in use and lowered to a lower level by use of a second permanently mounted crane of the wind turbine.

8. The transportation system according to claim 1, wherein at least a part of the second drive arrangement is displaceable in the longitudinal direction (LD) of the nacelle.

9. The transportation system according to claim 1, wherein the drive train component can be temporarily stored at a storage location in the nacelle by means of the displacement system.

10. The wind turbine nacelle with a transportation system according to claim 1.

11. A method of transporting a drive train component of a wind turbine comprising a tower and a nacelle arranged on top of the tower, the method comprising the steps of:
  individually connecting a drive train component to at least one slide supported by a transportation rail of a displacement system, the at least one transportation rail being arranged to support the drive train component during displacement thereof,
  displacing the drive train component inside the nacelle along the at least one transportation rail parallel to the rotor axis between an installation location for the drive train component and a second location by means of a first drive arrangement of the displacement system while being supported by the slides,
  connecting the drive train component to a second drive arrangement mounted on the nacelle and comprising at least one winch, the second drive arrangement being separate from the displacement system such that the at least one winch remains stationary while displacing the drive train component with the first drive arrangement, and
  vertically transporting the drive train component between the nacelle and a lower level by means of the second drive arrangement, the second drive arrangement operating independently of the operation of the displacement system.

12. The method according to claim 11 wherein the transportation by means of the second drive arrangement comprises the step of transporting the drive train component through an opening in the nacelle floor.

13. The method according to claim 11 comprising the step of lifting the drive train component by means of a lifting arrangement of the displacement system.

14. A transportation system for transporting at least one drive train component of a wind turbine nacelle, the transportation system comprising at least one pair of transportation rails being arranged to support the at least one drive train component during displacement thereof,
  the transportation rails facilitating displacement of the drive train component substantially parallel to the rotor axis of the nacelle between an installation location for the drive train component and a second location vertically aligned with an opening in the nacelle floor, and
  the transportation system facilitating transportation of the at least one drive train component vertically through the opening between the rails by means of a drive arrangement.

* * * * *